United States Patent
McCormack et al.

(10) Patent No.: US 6,243,088 B1
(45) Date of Patent: *Jun. 5, 2001

(54) USER DEFINED EXTENSIBLE VISUAL INTEGRATION

(75) Inventors: John McCormack, San Jose; Mark Sapsford, Sunnyvale; Christopher A. White; Vidya R. Babu, both of Saratoga, all of CA (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/000,601

(22) Filed: Dec. 30, 1997

(51) Int. Cl.[7] .......................................... G06F 3/00
(52) U.S. Cl. .............................. 345/333; 345/339
(58) Field of Search .................... 345/333–334, 345/338–340, 345, 357, 975; 707/501, 512

(56) References Cited

U.S. PATENT DOCUMENTS

| | | | |
|---|---|---|---|
| 5,754,939 | * 5/1998 | Herz et al. | 707/501 X |
| 5,844,554 | * 12/1998 | Geller et al. | 345/333 |
| 5,872,973 | * 2/1999 | Mitchell et al. | 709/332 |
| 5,963,952 | * 10/1999 | Smith | 707/501 X |
| 5,987,480 | * 11/1999 | Donohue et al. | 707/501 |
| 6,018,748 | * 1/2000 | Smith | 707/501 |
| 6,029,182 | * 2/2000 | Nehab et al. | 707/501 X |
| 6,154,213 | * 11/2000 | Rennison et al. | 345/333 X |

* cited by examiner

Primary Examiner—Raymond J. Bayerl
Assistant Examiner—X. L. Bautista
(74) Attorney, Agent, or Firm—Hickman Palermo Truong & Becker LLP (57) ABSTRACT

A method and system are provided for allowing users to attach functionality to one or more panels in a panel sequence. The panel sequence may be presented to the user, for example, as a sequence of HTML pages that walk the user through the choices associated with a particular task. The functionality attached to the panel by the user may allow users to set on the panel, or access from the panel, user-specific information that indicates how the user should respond to the panel. Techniques are described for attaching the functionality in a conditional manner, so that the functionality is only attached o the panel when the panel is displayed in a certain context. Context information is passed from each panel in the panel sequence to the next to facilitate the determination as to whether the user-specified functionality should be displayed.

14 Claims, 7 Drawing Sheets

USER DEFINED EXTENSIBLE VISUAL INTEGRATION

FIELD OF THE INVENTION

The present invention relates to interfaces presented to a user during the performance of tasks on a computer system and, more specifically, to user-defined visual extensions to such interfaces.

BACKGROUND OF THE INVENTION

The complexity of the tasks that can be accomplished by computer programs is ever increasing. For example, word processing programs of the past did little more than receive, store, and allow users to print text input. Word processing programs today allow users to automatically generate and embed tables, summaries, and three-dimensional colored graphs. As the complexity of the tasks that can be performed has increased, it has become critical to provide user-friendly interfaces for performing the tasks. To a user, a computer program's capabilities are worthless if accessing those capabilities is beyond the skill of the user.

One technique that allows users to perform relatively complex tasks without requiring an inordinate amount of training involves breaking the task up into a sequence of sub-tasks. The user is then presented with a sequence of panels that correspond to the sequence of sub-tasks. In this context, the term "panel" refers to any visual display unit, including but not limited to screens, windows, dialog boxes, hypertext pages, and message boxes.

Within each panel of the panel sequence, the user is only required to enter the information relevant to the particular sub-task associated with the currently displayed panel. Because the user is able to concentrate on a single sub-task at a time, the user is less likely to become overwhelmed by the complexity of the larger task.

For example, consider the task of creating a report from information in a database. Such a task requires a user to make a multitude of choices, including choices related to the contents of the report and choices related to the format of the report. To assist a user, the database application may present the user with a first panel that allows a user to select the source of the data, a second panel that allows a user to specify how the data is to be ordered and grouped, a third panel that allows the user to specify the general type of layout to be used by the report, a fourth panel that allows the user to specify the styles to be used for each element of the report, etc. By stepping through these panels in sequence, a user with little or no training on the database application software may be able to create a professional quality report with little difficulty.

Unfortunately, the information presented on the sub-task panels of the computer program typically only addresses what the user can do at that point in the task, not what a user should do. For example, the company to which a user belongs may have certain policies about how a report should be formatted. However, the panel presented by the program will allow the user to select any format without giving any indication that a certain format should be used. In situations such as this where policies restrict users to certain choices, users may ensure the selection of correct choices by maintaining and consulting policy manuals.

In other situations, the correct choice of options may be dictated by factors other than company policy. For example, consider a sequence of panels for the task of setting up an electronic mail client. One panel in the sequence may ask the user to specify the name of the electronic mail server through which the client is to send and receive electronic mail. The mail client will not operate correctly if a valid mail server is not specified (not because of any policy on what an electronic mail server can be named, but because the specified name must identify an actual electronic mail server). In situations such as this, the user that is setting up the electronic mail client may have to expend an unacceptable amount of time and resources to determine the appropriate information. For example, the user may have to make several calls to a help desk to locate someone who knows the name of the appropriate electronic mail server.

Various approaches may be taken to customize software to the specific requirements of a user or customer. For example, the software developer may simply alter the application software's structure, or replace an entire task with a customer-defined task. The software may also be designed in a way that allows users to associate their own static information with a panel or icon. However, once associated with a panel or icon, such static information would be tied to the panel or icon regardless of the context in which the panel or icon is displayed.

For example, some network management platforms, including Open View by Hewlett Packard, allow administrators to add or replace menu items for the application. Such user-specified menu items are defined for the entire set of users of the application, and do not take into account the user's context. Further, the ability of a user to supply menu items does not allow for the partial replacement of task steps associated with the menu item. Thus, this feature cannot be used, for example, to modify the panels associated with the task of adding a new device to the system in a way that implements or enforces the specific naming policies defined by the customer's organization.

Based on the foregoing, it is clearly desirable to provide a mechanism that reduces the difficulty of using computer programs to performing complex tasks. It is further desirable provide information about what selections a users should make with respect to a particular sub-task at the time the user is presented with a panel that indicates the selections a user can make with respect to the particular sub-task. It is further desirable to provide a mechanism that allows users to customize tasks by augmenting and/or partially replacing task steps. It is also desirable, in situations where a user may arrive at the same panel through different routes, to provide the user information that takes into account how a user arrived at a particular panel.

SUMMARY OF THE INVENTION

A method and system are provided for allowing users to attach functionality to one or more panels in a panel sequence. The panel sequence may be presented to the user, for example, as a sequence of HTML pages that walk the user through the choices associated with a particular task. The functionality attached to the panel by the user may allow users to see on the panel, or access from the panel, user-specific information that indicates how the user should respond to the panel.

Techniques are provided for attaching the functionality in a conditional manner, so that the functionality is only attached to the panel when the panel is displayed in a certain context. Context information is passed from each panel in the panel sequence to the next to facilitate the determination as to whether the user-specified functionality should be displayed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for increasing the functionality of the panels used to walk a user through a complex task is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
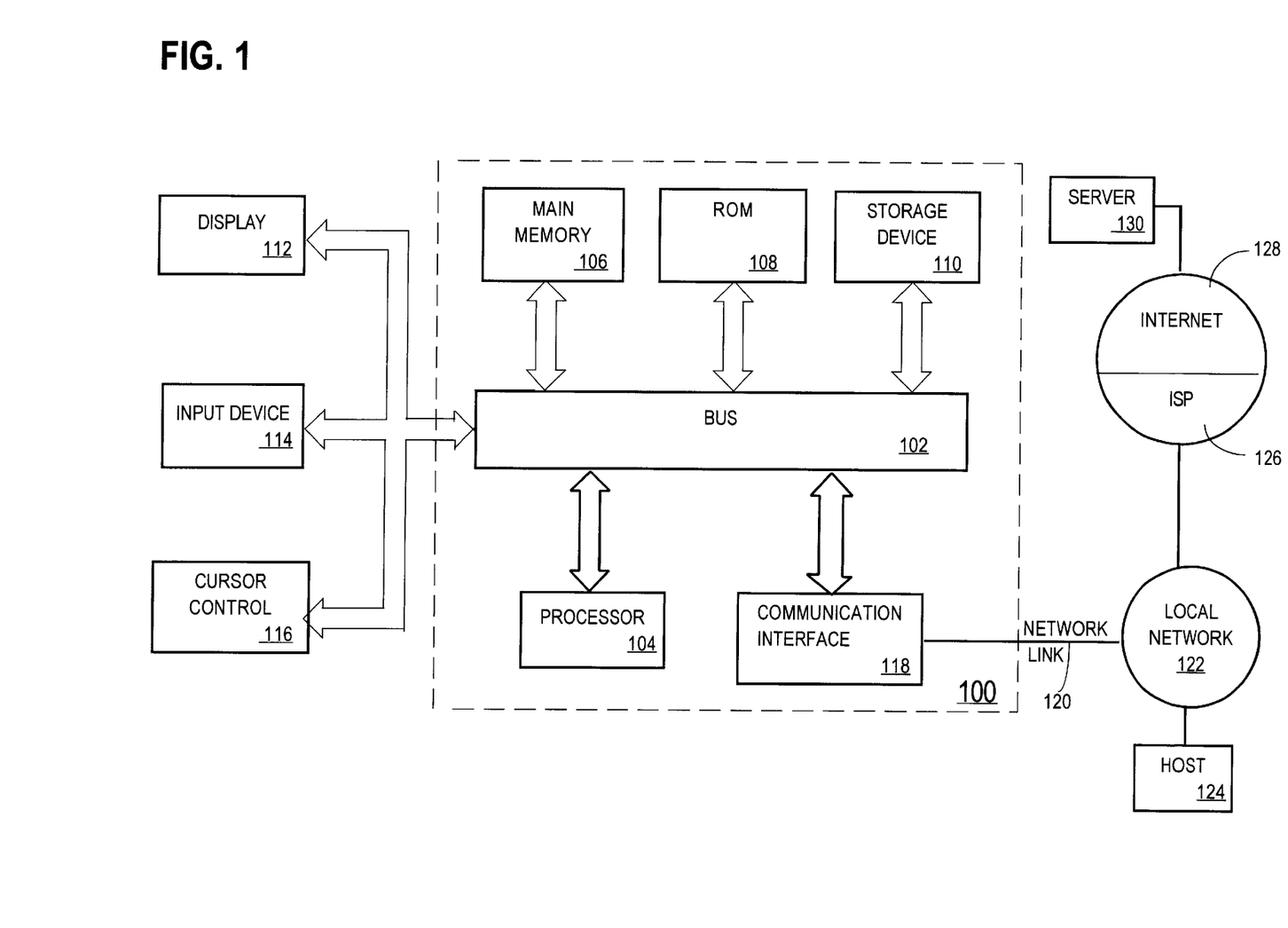
FIG. 1 illustrates a system on which embodiments of the present invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for increasing the functionality of the panels used to walk a user through a complex task. According to one embodiment of the invention, the functionality of the panels used to walk a user through a complex task are increased by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal. The data can be processed by the appropriate circuitry and placed on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

For the purposes of explanation, embodiments of the present invention shall be described with reference to user interfaces provided by a computer system. However, the present invention is not limited to any particular type of hardware device. For example, the user interfaces may be provided by network routers, switches or other types of network entities.

Functional Overview

A system and method are provided for attaching user-specified functionality to panels presented in a software application. The user-specified functionality for a panel may include, for example, causing the panel to display company policies that relate to or dictate the choices a user should make with respect to the options presented by that panel. According to one embodiment, a customer initially supplies the location of the resource that provides the functionality that is to be associated with a given panel.

The resource may be a program that performs an action, or a file of information to be displayed. In the case that the resource is user-specified information, the panel retrieves and displays the user-specified information when the panel is subsequently displayed, or displays a user interface object through which a user can cause the user-specified information to be displayed. Similarly, in the case in which the resource is a program that performs an action, the program associated with the panel is invoked when the panel is subsequently displayed, or the panel displays a user interface object through which a user can cause the program to be invoked.

As shall be described in greater detail, mechanisms are provided for attaching context-dependent functionality to a panel. When the user-specified functionality associated with a panel is context-dependent, the panel only includes the functionality when the panel is displayed in a particular context. The context of a panel may include, for example, the identity of a user, how the user arrived at the panel, previous information entered by the user, etc.

Panel Sequences

Figure 2:
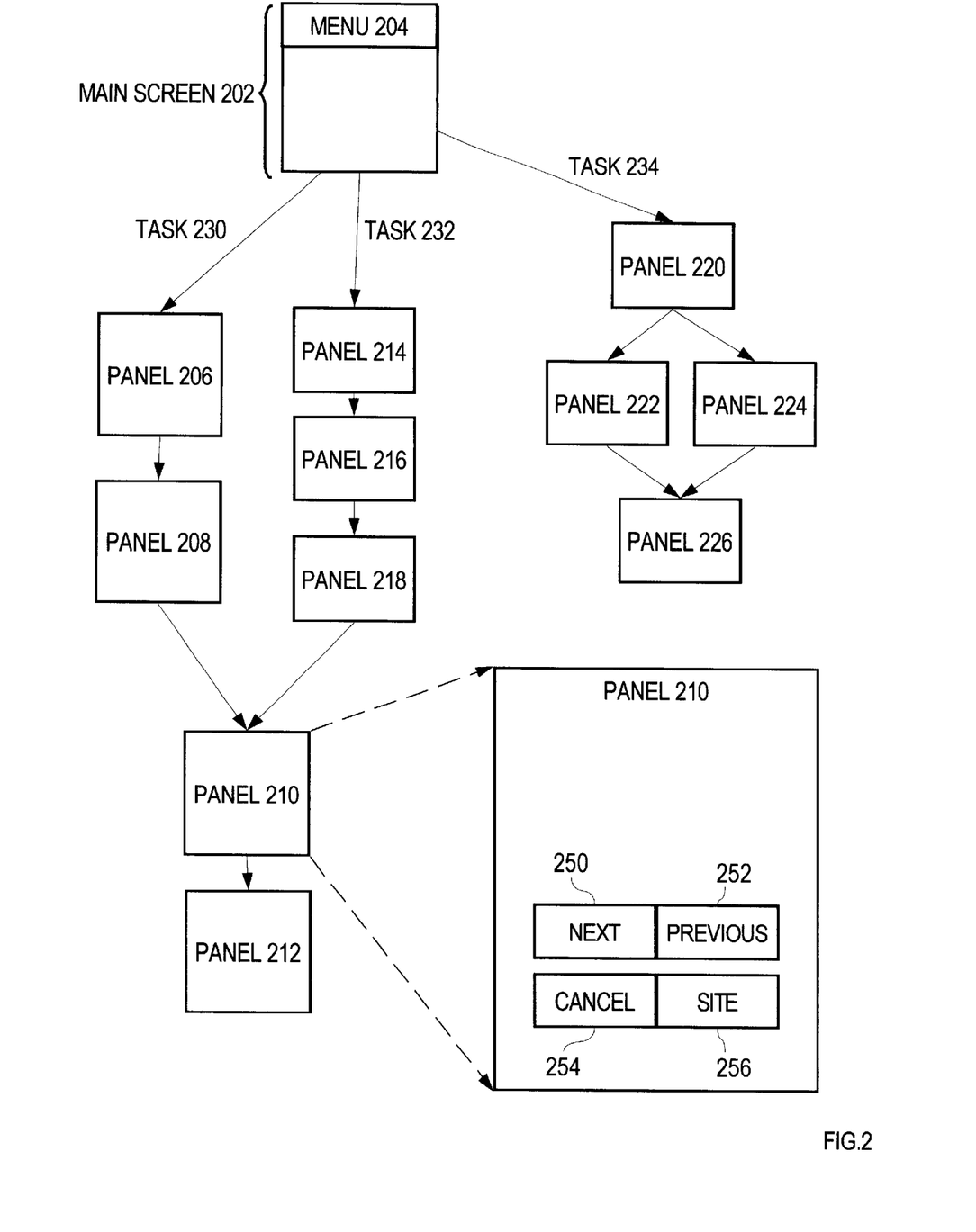
FIG. 2 is a block diagram that illustrates panel sequences.

Referring to FIG. 2, it is a block diagram that illustrates the sequence of screen displays presented by an application program. Upon starting the application program, the user is presented with a main screen 202. The main screen 202 contains user interface objects that may be selected by the user to initiate complex tasks. Such user interface objects may include, for example, a menu 204 that lists separate menu items for each of the tasks.

The application program illustrated in FIG. 2 is able to perform three tasks: tasks 230, 232 and 234. When a user enters input that selects the performance of a task, the user is presented with a sequence of panels, each of which allows the user to make choices about a sub-task of the task. The arrows in FIG. 2 illustrate the sequence in which panels are displayed to a user. For example, if the user selects task 230, the software application will present the user with panels 206, 208, 210 and 212, in that order. If a user selects task 232, the software application will present the user with panels 214, 216, 218, 210 and 212, in that order. If a user selects task 234, the software application will present the user with panel 220, and then either panel 222 or 224 (depending on the information entered into panel 220), and then panel 226.

In FIG. 2, for the purpose of explanation, panel 210 is shown with a next button 250, a previous button 252, a cancel button 254 and a site button 256. According to one embodiment, these or similar user interface objects are on some or all of the panels associated with tasks 230, 232 and 234.

Selection of the previous button 252 causes the software application to cease displaying the current panel and to re-display the panel that was displayed immediately previous to the current panel. Thus, for example, if panel 218 was the panel displayed previous to panel 210 and previous button 252 is selected on panel 210, then the software application ceases to display panel 210 and re-displays panel 218. Selection of the previous button 252 may be desirable, for example, when a user wants to change previously entered information.

Selection of the next button 250 causes the software application to cease displaying the current panel and to begin displaying the next panel in the panel sequence of the task being performed. For example, selection of next button 250 on panel 210 would cause panel 210 to cease to be displayed and panel 212 to be displayed. The panel that is "next" after any given panel may not always be the same, depending on the context in which the next panel is selected. For example, panel 220 may be followed by either panel 222 or 224. The factors that determine whether panel 220 is followed by panel 222 or 224 may include, for example, the identity of the user performing task 234 and/or the information that the user entered using panel 220. When a panel belongs to the panel sequence of more than one task, the panel that is "next" may vary based on which panel sequence the user is following (i.e. which task is being performed).

Selection of the cancel button 254 causes the software application to cease displaying the current panel and to return to displaying the main screen 202. All information entered through the panels in the panel sequence up to that point is discarded, and the task associated with the panel sequence is not performed.

Selection of the site button 256 causes user-specified functionality to be invoked. The type of user-specified functionality may vary from implementation to implementation and from context to context. The functionality may cause the display of user-specified information, for example, containing specific instructions about the selections a user should make on the current panel. Alternatively, the information may take the form of a user-specified "next" panel. By associating a user-specified panel with the site button 256, a customer can deviate from or supplement the panel sequence provided for a given task by the software application developer.

User-Customized Panel Regions

The use of a site button 256, as described above, is merely one example of a mechanism for providing user-specified functionality to a user. Specifically, the site button 256 is an example of a user interface object whose appearance does not vary from context to context, but whose behavior varies based on the context (the panel on which it resides, the entry point to the panel, the identity of the user, previously-entered user information, etc.) in which it is selected.

In alternative embodiments of the invention, the visual appearance of the user-interface object used to provide customer-defined behavior may itself vary based on the context in which it is displayed. In other embodiments, the panel may contain a region that displays user-specified information, rather than a user-interface object for accessing the user-specified functionality.

Figure 3:
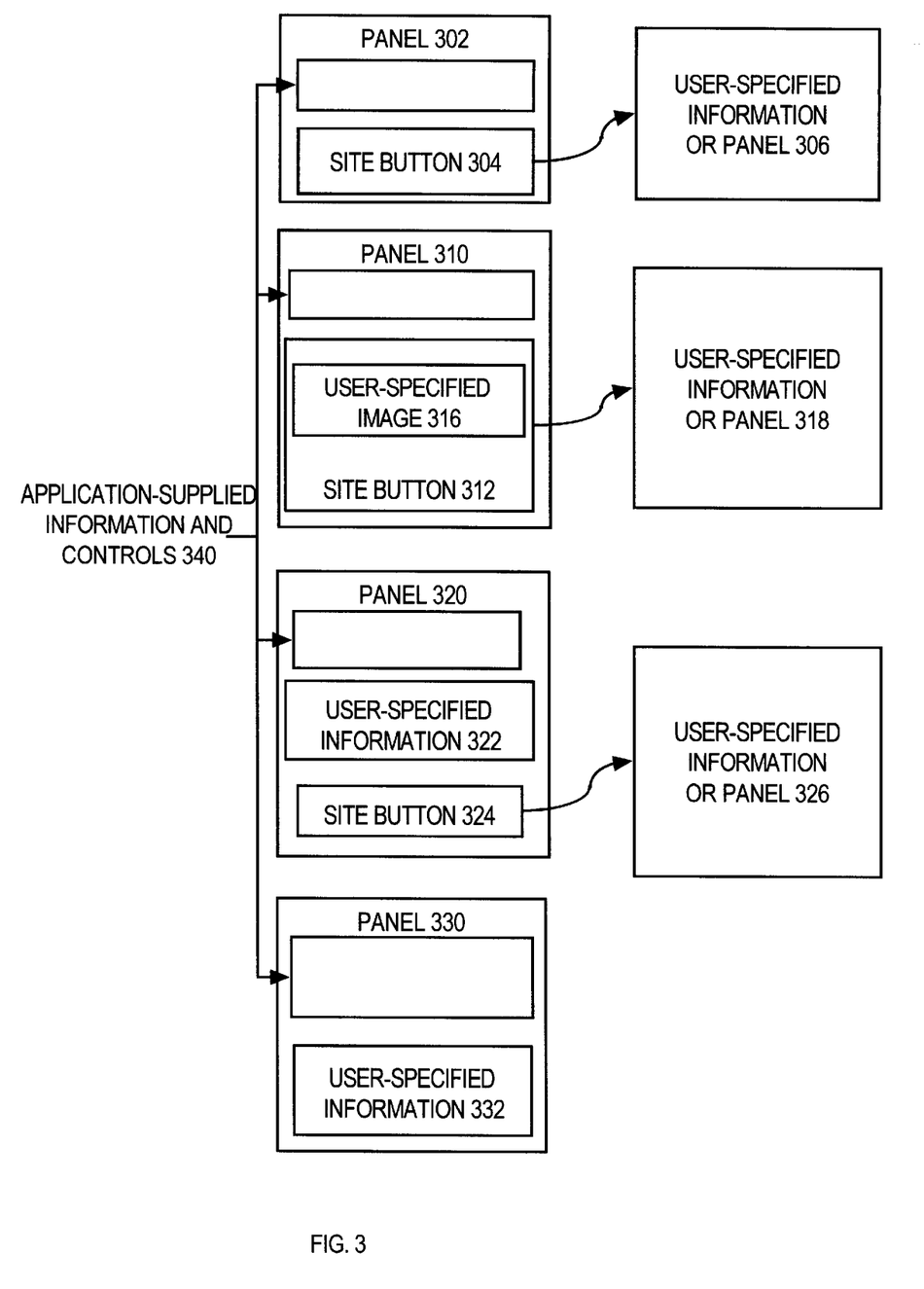
FIG. 3 is a block diagram that illustrates various approaches to supplying user-specified resources to a user.

FIG. 3 is a block diagram that illustrates various approaches used to present user-specified functionality according to embodiments of the invention. Referring to FIG. 3, it illustrates four panels 302, 310, 320 and 330. Each of the panels includes a region that contains application-supplied information and controls 340. Such controls may include, for example, list boxes, check boxes, text fields, scroll bars, buttons, etc. for receiving user input relating to the sub-task associated with the panel.

To provide user-specified functionality for the sub-task associated with panel 302, panel 302 includes a site button 304. In response to selection of site button 304, user-specified information 306 is displayed to the user. Various mechanisms may be used to present user-specified information 306 when site button 304 is selected, including but not limited to, a pop-up window, a help screen, or a separate panel.

Panel 310 includes a site button 312 which, when selected, causes user-specified information 318 to be displayed to the user. Unlike button 304, button 312 includes a user-specified image 316, where the image 316 that is displayed is selected based on the context in which site button 312 is displayed. Thus, the image 316 on site button 312 may be different for one user than the image displayed on the same button of the same panel for another user. Similarly, the image 316 may be different when panel 310 is arrived at through one entry point than the image that would be displayed if panel 310 is arrived at through a different entry point.

In addition to a site button 324 for displaying user-specified information 326, panel 320 includes a region that displays user-specified information 322. By displaying user-specified information 322 as part of the panel 320, the user is presented with the information without having to perform the separate step of selecting a site button 324. However, when user-specified information 322 is automatically displayed with the panel 320, the software application to which panel 320 belongs retrieves the user data from storage every time panel 320 is displayed in the relevant context. Thus, when the user did not actually require the information, the resources expended in retrieving the information would be wasted.

Panel 330 does not have a site button. Rather, panel 330 has a region that automatically displays user-specified information 332. Similar to user-specified information 322, the user-specified information 332 is automatically retrieved at the time panel 330 is displayed in the appropriate context, and therefore may be retrieved in situations where the user would not have otherwise requested the retrieval.

Significantly, the user-specified information displayed on panels, or in response to the selection of interface objects on the panels, need not be limited to text or images. Rather, the user-specified information may take the form of a Java™ applet or any other form of active component. Further, the panel itself may be in the form of a Java™ applet. Thus, the present invention is not limited to any particular type of user-specified information.

Attaching User-Specified Functionality

Various formats for providing user-specified functionality are described above. By definition, the software application does not initially contain or know where to locate the resources that provide such functionality. Therefore, according to one aspect of the invention, the software application includes a mechanism by which a customer can attach such functionality to one or more panels that are part of the software application.

According to one embodiment of the invention, the software application assigns "panel identifiers" to some or all of the panels of the application, where the panel identifier for a given panel is unique relative to the panel identifiers assigned to all of the other panels. A customer attaches user-specified functionality to a particular panel by causing the software application to store data that maps the panel identifier of the particular panel to data that uniquely identifies the resources that provide the user-specified functionality that the customer desires to associate with the particular panel.

Data that uniquely identifies a resource that provides the user-specified functionality shall be referred to hereinafter as a "resource identifier". A resource identifier may include, for example, a path and name of a file that contains customer policies, or the path and name of a program that provides desired functionality. In web-based applications, which shall be described in greater detail hereafter, the resource identifier may include a Universal Resource Locator (URL) that indicates, for example, the location of a user-specified HTML page or Common Gateway Interface (CGI) program.

According to one embodiment, the software application stores data that maps panel identifiers to resource identifiers in a datastore mechanism, such as a database. The resource that is identified by a resource identifier is considered to be "attached" to a panel that is identified by the panel identifier that maps to the resource identifier.

The event that triggers the software application to access the panel-to-resource mapping information in the database will vary from implementation to implementation. For example, assume that the panel to be displayed has the format of panel 302. At the time that the user causes panel 302 to be displayed, the software application does not access the panel-to-resource mapping. Rather, the software application simply displays panel 302 with a site button 304 that does not contain any user-specified functionality. Only upon selection of site button 304 does the software application access the panel-to-resource mapping in the database. Specifically, the software application searches the database based on the panel identifier of panel 302. If the panel identifier is mapped to a resource identifier, then the resource associated with the resource identifier is retrieved and displayed to the user (in the case of an information resource) or invoked (in the case of a program resource).

On the other hand, if the panel to be displayed has the format of panel 330, then the software application accesses the panel-to-resource mapping when the panel 330 is initially displayed. If the panel identifier from panel 330 is mapped to a resource identifier, then the information resource associated with the resource identifier is retrieved and displayed as user-specified information 332 on the panel itself.

The panels 310 and 320 are formatted to display one set of user-specified information (316 and 322) when the panels are displayed, and another set of user-specified specified information (318 and 326) when site buttons on the panels are selected. Under these conditions each panel-to-resource mapping includes property information that indicates where and when the information should be displayed. For example, one entry in the panel-to-resource mapping may be:

panel identifier=panel 310
    user-specified resource=user-specified image 316
    trigger=display of panel 310
    display location=on site button 312

A second entry in the panel-to-resource mapping may be:

panel identifier=panel 310
    user-specified resource=user-supplied information 318
    trigger=selection of site button 312
    display location=separate panel In response to receiving input to display a panel, the application software searches the panel-to-resource mapping for any entry that (1) is associated with the panel to be displayed, and (2) has the trigger "display of panel". In response to receiving input that selects the site button of a panel, the application software searches the panel-to-resource mapping for any entry that (1) is associated with the current panel, and (2) has the trigger "selection of site button".

According to one embodiment of the invention, user-specified resources attached to a panel may be associated with many different triggers. For example, rather than one site button, a panel may have many buttons, each of which may be associated with a different user-specified resource. Under those conditions, the trigger event for each resource would be the selection of the button with which the resource is associated.

Mechanism for Attaching User-Specified Functionality

As described above, embodiments of the invention allow customers to attach user-specified functionality to the panels of a software application. Various mechanisms may be provided to the user to facilitate the attachment process. According to one embodiment, panels to which customers may attach resources include site buttons, where the default behavior of the site buttons allows users to specify the resources to be attached to the panel.

For example, assume that a customer that has not attached any resources to panel 302 is presented with panel 302. Upon detecting selection of site button 304, the software application inspects the panel-to-resource mapping. Upon finding that the panel identifier associated with panel 302 is not mapped to any resource identifier, the software application presents the user with a panel through which the user may specify the location of a resource that should be associated with panel 302. The software application then stores a panel-to-resource mapping entry in response to the user input. The panel-to-resource mapping may be stored within or external to the database. Upon a subsequent selection of site button 304, the software application finds the entry and displays the information contained in the user-specified resource.

Alternatively, the software application may simply provide a menu item which, when selected, presents the user with a list box that displays a list of panels to which resources may be attached, and user interface objects that allow the user to specify resources that are to be attached to each of the panels.

Context-Dependent Resources

Often, a software application will have two or more tasks that have a common sub-task. Under these conditions, a user could arrive at the panel that corresponds to the common sub-task from multiple entry points. For example, the step of selecting a font may be a sub-task of both (1) the task of designing a report and (2) the task of designing a chart. Therefore, the panel that allows the user to select a font (the "SFP") may be part of the report design panel sequence and the chart design panel sequence. The panel that immediately precedes the SFP in the report design panel sequence constitutes one entry point to the SFP. The panel that immediately precedes the SFP in the chart design panel sequence constitutes another entry point to the SFP. Panel 210 in FIG. 2 is an example of a panel that has multiple entry points.

When a panel has multiple entry points, it may be desirable for the user-specified functionality attached to the panel to vary based on which entry point was used to arrive at the panel. For example, a company may have a policy to use one font (font1) in reports and a different font (font2) in charts. To ensure that the user selects the correct font, a user may attach to the SFP information about which font should be selected. However, the information should specify font1 if the SFP is accessed as part of the report design panel sequence, and specify font2 if the SFP is accessed as part of the chart design panel sequence.

When the resource attached to the same panel varies based on the context in which the panel is displayed, the resource is referred to herein as "context-dependent resource". Panels that have multiple entry points are examples of panels that are likely to have context-dependent resources attached to them. However, the ability to attach context-dependent resources to a panel is useful in other situations as well.

For example, a company may have a policy that the filename under which each document is saved should include the title of a document. Further, the selection of a title may be performed on the first panel in a panel sequence and the selection of a file name may be performed on the fifth panel in the panel sequence. Under these conditions, it would be desirable to attach to the fifth panel in the sequence user-specified functionality to both indicate the company policy to the user and remind the user what the title was specified to be.

Attaching Context-Dependent Resources

The technique of mapping panel identifiers to resource identifiers described above works well when the same information is to be displayed with a panel regardless of the context. However, context-dependent resources are not associated with a panel, but with the combination of a specific panel and a specific context.

According to one embodiment of the invention, a context-dependent resource is attached to a panel/context combination by storing in the database an entry that establishes a correlation between a panel context identifier and a resource identifier. As used herein, the term "panel context identifier" refers to a set of information that identifies a specific panel used in a specific context. A panel context identifier may include, for example, a panel identifier and a task identifier. Thus, the panel context identifier (SFP, report_task_id) specifies the SFP panel when displayed as part of the report task panel sequence. Similarly, the panel context identifier (SFP, chart_task_id) specifies the SFP panel when displayed as part of the chart panel sequence.

The context portion of a panel context identifier will vary based on the context criteria that is important to the customer. For example, a particular set of context-dependent resources apply to users of a particular user class that use a particular panel. Under these circumstances, the panel context identifier that is mapped to that set of context-dependent resources may take the form of (panel identifier, user class identifier).

Similarly, a particular set of context-dependent resources apply to users that have entered certain data on a previous panel. Under these circumstances, the panel context identifier that is mapped to that set of context-dependent resources may take the form of (panel identifier, target data), where "target data" is the data that the user must have previously entered in order to have access to that particular set of context-dependent resources.

Panel context identifiers may combine different types of context criteria. For example, a particular set of context-specific information may apply to users of a particular panel that (1) belong to a particular group, (2) have entered a particular set of data in previous panels, and (3) have entered the panel through a particular entry point. Under these conditions, the panel context identifier that is mapped to that set of context-dependent resources may take the form of (panel identifier, user class id, target data, entry point).

Dynamically Constructed Customer Information

In the examples given above, panel context identifiers are mapped to resource identifiers that identify user-specified resources. According to one embodiment of the invention, the user-specified resources need not be static, pre-existing documents or files. Rather, the user-specified resources may be programs that perform actions. According to one embodiment of the invention, the resources include programs that dynamically generate information based upon the panel identifier and context information.

Figure 4:
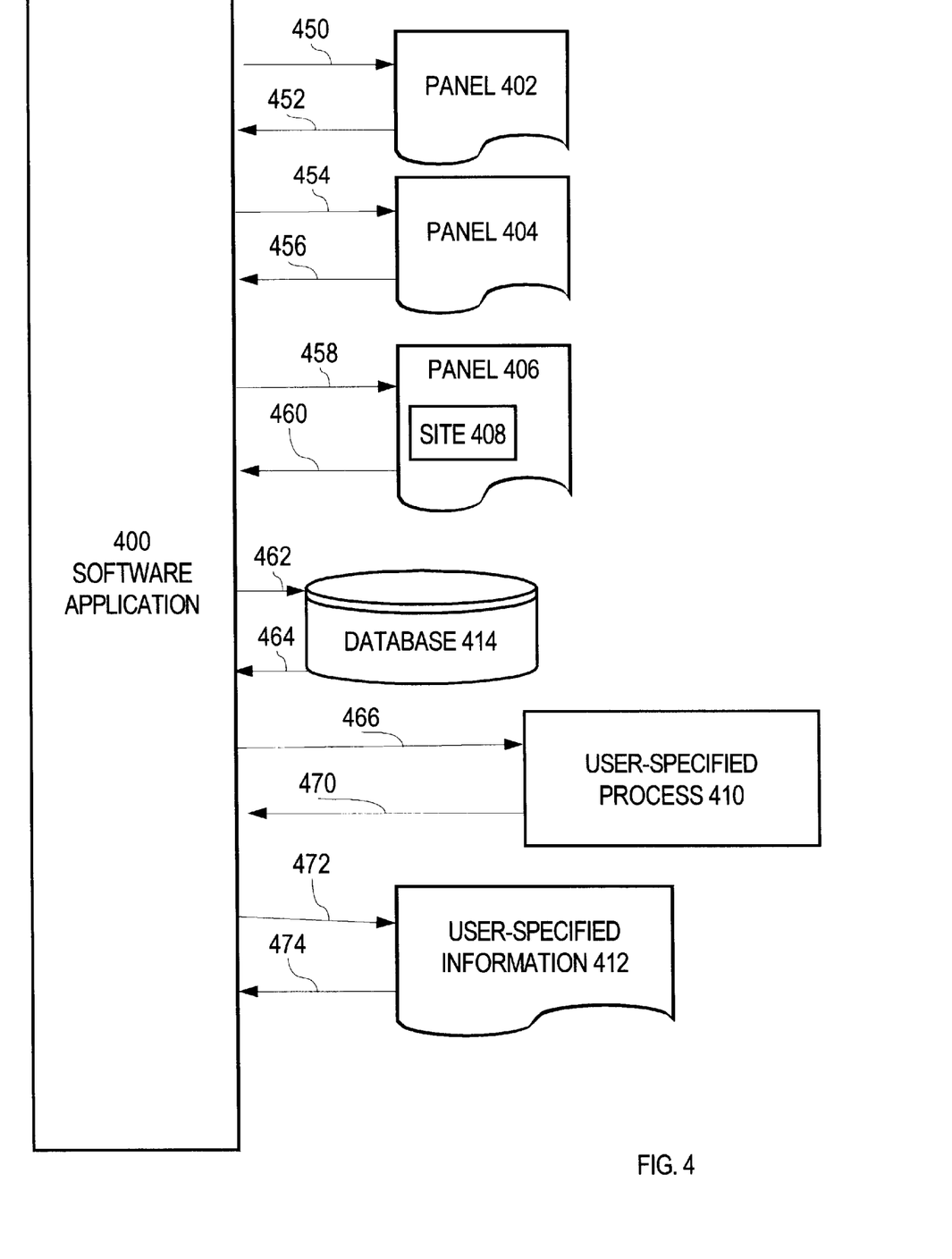
FIG. 4 is a block diagram that illustrates a software application that includes a panel that sends data to a user-supplied process, according to an embodiment of the invention.

Referring to FIG. 4, it illustrates a software application 400 configured to display dynamically generated user-specified functionality according to an embodiment of the invention. For the purposes of explanation, it shall be assumed software application 400 is capable of generating reports, and that a user has submitted user input to software application 400 to initiate the panel sequence associated with designing a report.

In response to the user input, software application 400 displays the first panel 402 in the panel sequence for designing a report. The transmission of the data associated with panel 402 is indicated by arrow 450. Panel 402 may be, for example, a form that allows the user to specify the source of information for the report. When the user has finished entering the information into panel 402, the user enters input to proceed to the next panel in the report design panel sequence. Such user input may be, for example, the selection of a "next" button on panel 402.

In response to the user entering input to proceed to the next panel, information that has been entered in the current panel is sent back to software application 400 (arrow 452). The software application then displays the next panel 404 in the report design panel sequence (arrow 454). The user enters the information requested by panel 404 and again selects an option to proceed to the next panel in the sequence. The information entered in panel 404 is sent back to the software application 400 (arrow 456).

In response to the user entering input to proceed to the next panel, the software application 400 displays panel 406. For the purpose of explanation, it shall be assumed that the customer has attached user-specified functionality to panel 406. Consequently, a database 414 maintained by the software application 400 includes an entry that maps the panel identifier of panel 406 (PANEL-ID1) to a resource identifier (RES-ID1).

To activate the user-specified functionality associated with panel 406, the user selects site button 408. In response to selection of site button 408, data that indicates that site button 408 was selected is sent back to software application 400 (arrow 460). Software application 400 then accesses the database 414 (arrow 462) to determine whether the database contains any panel-to-resource mapping associated with PANEL-ID1. In the present example, database 414 contains a panel-to-resource resource mapping that maps PANEL-ID1 to RES-ID1. The database 414 transmits RES-ID1 back to software application 400 (arrow 464).

Upon receiving RES-ID1 from database 414, software application 400 activates (arrow 466) a user-specified process 410 that is associated with RES-ID1. The user-specified process 410 may be, for example, a process that is executing at the time it receives the activation message, or may alternatively be a process (such as a CGI program) that begins execution upon activation.

In the present example, the user-specified process 410 is configured to dynamically generate information. According to one embodiment of the invention, software application 400 includes context information in the transmission to user-specified process 410. Such context information includes, for example, the identity of panel 406, the identify of the user, the resource identifier (RES-ID1), data that the user entered during previous selections, data that indicates that the in-progress task is report design, etc.

In response to the information from software application 400, user-specified process 410 dynamically generates and transmits to the software application 400 (arrow 470) information that should be displayed to the user. Because the user-specified process 410 receives context information, the information sent back to the software application 400 may include context-dependent information. For example, software application 400 may send to user-specified process 410 data that identifies the user, and the information returned by user-specified process 410 may be information specifically for the user class to which the user belongs.

Upon receiving the dynamically-generated information, software application 400 causes the information to be displayed to the user. Arrow 472 indicates the transmission of the user-specified information 412 to the user, and arrow 474 indicates a message sent back to software application 400 when the user has finished viewing the user-specified information 412.

The World Wide Web

The World Wide Web includes a network of servers on the Internet, each of which is associated with one or more HTML (Hypertext Markup Language) pages. The HTML pages associated with a server provide information and hypertext links to other documents on that and (usually) other servers. Servers communicate with clients by using the Hypertext Transfer Protocol (HTTP). The servers listen for requests from clients for their HTML pages, and are therefore often referred to as "listeners".

Users of the World Wide Web use a client program, referred to as a browser, to request, decode and display information from listeners. When the user of a browser selects a link on an HTML page, the browser that is displaying the page sends a request over the Internet to the listener associated with the Universal Resource Locator (URL) specified in the link. In response to the request, the listener transmits the requested information to the browser that issued the request. The browser receives the information, presents the received information to the user, and awaits the next user request.

Traditionally, the information stored on listeners is in the form of static HTML pages. Static HTML pages are created and stored at the listener prior to a request from a web browser. In response to a request, a static HTML page is merely read from storage and transmitted to the requesting browser. Currently, there is a trend to develop listeners that respond to browser requests by performing dynamic operations. For example, a listener may respond to a request by issuing a query to a database, dynamically constructing a web page containing the results of the query, and transmitting the dynamically constructed HTML page to the requesting browser.

HTML-Based Application Software

According to an embodiment of the invention, panels are supplied to users in the form of HTML pages. These pages are transmitted using HTTP from a listener to a client for interpretation and display by a browser executing on the client. The information entered in a panel is transmitted back to the listener when a user selects a hyperlink in the HTML page that constitutes the panel.

Figure 5:
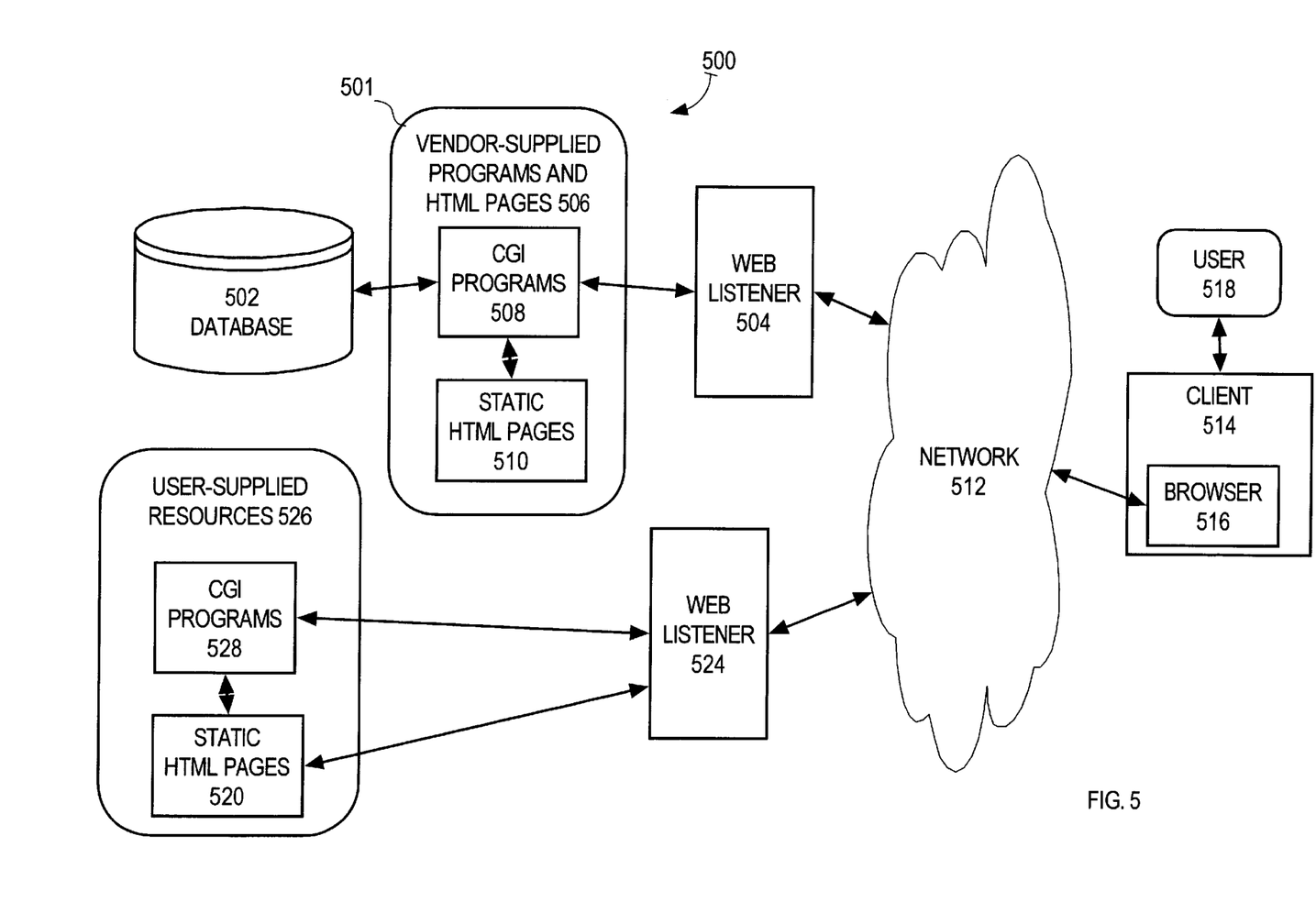
FIG. 5 is a block diagram that illustrates a software application that allows user-specified functionality to be attached to HTML-based panels, according to an embodiment of the invention.

Referring to FIG. 5, it illustrates a system 500 that includes software application 501 that generates panels in the form of HTML pages. In system 500, the software application 501 is implemented as collection of one or more vendor-supplied programs and HTML pages 506. These vendor-supplied programs and HTML pages 506 may include, for example, CGI programs 508 and static HTML pages 510, each of which is associated with a URL. The software application 501 is coupled to a web listener 504 and a database 502.

A user 518 performs tasks using the software application 501 by causing a browser 516 on a client 514 to transmit commands to the software application 501 through network 512 and web listener 504. Software application 501 performs the specified actions and transmits information back to browser 516. According to one embodiment of the invention, the communication between web listener 504 and browser 516 is performed using HTTP, and the information transmitted back to browser 516 from software application 501 is in the form of HTML code.

System 500 includes a second web listener 524 that has access to user-supplied resources 526. The user-supplied resources may include, for example, CGI programs 528 and static HTML pages 520. Each of the user-supplied resources is associated with a URL and is selected in response to browser 516 transmitting the appropriate URL over network 512.

A system that uses HTML pages and a site button is merely one exemplary application of the techniques described herein. The specific elements employed in any given embodiment will vary from implementation to implementation. For example, a Java™ applet may be used to provide a window for rendering HTML pages that are linked to a site button. In addition, embodiments may not use a server to control the flow and context of a panel sequence. For example, a client implementation may perform the panel-to-panel navigation without intervention of the server for every action.

Operation of HTML-Based Application Software

Figure 6A:
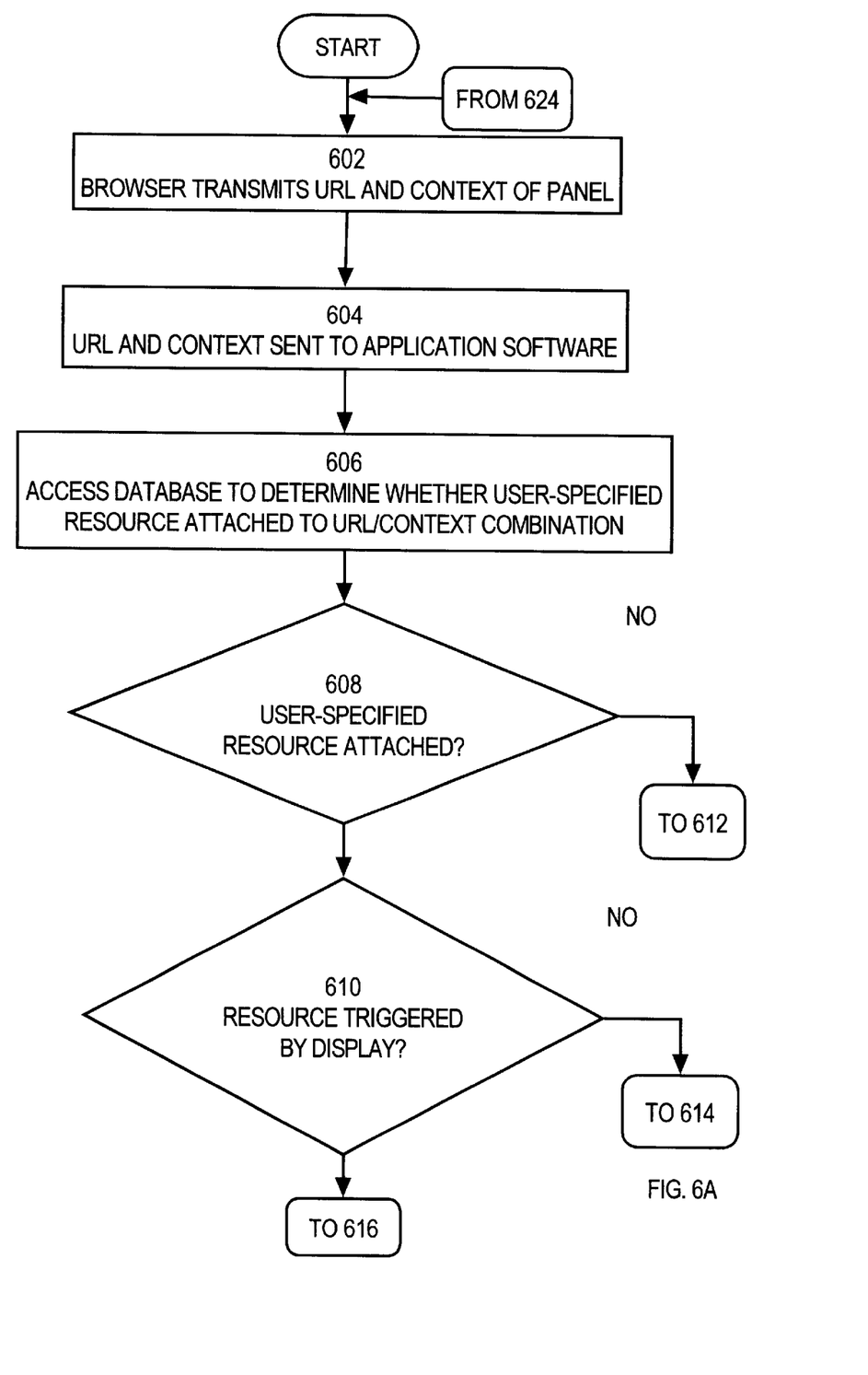
FIGS. 6a and 6b are a flow chart of steps performed by the system illustrated in FIG. 5.
Figure 6B:
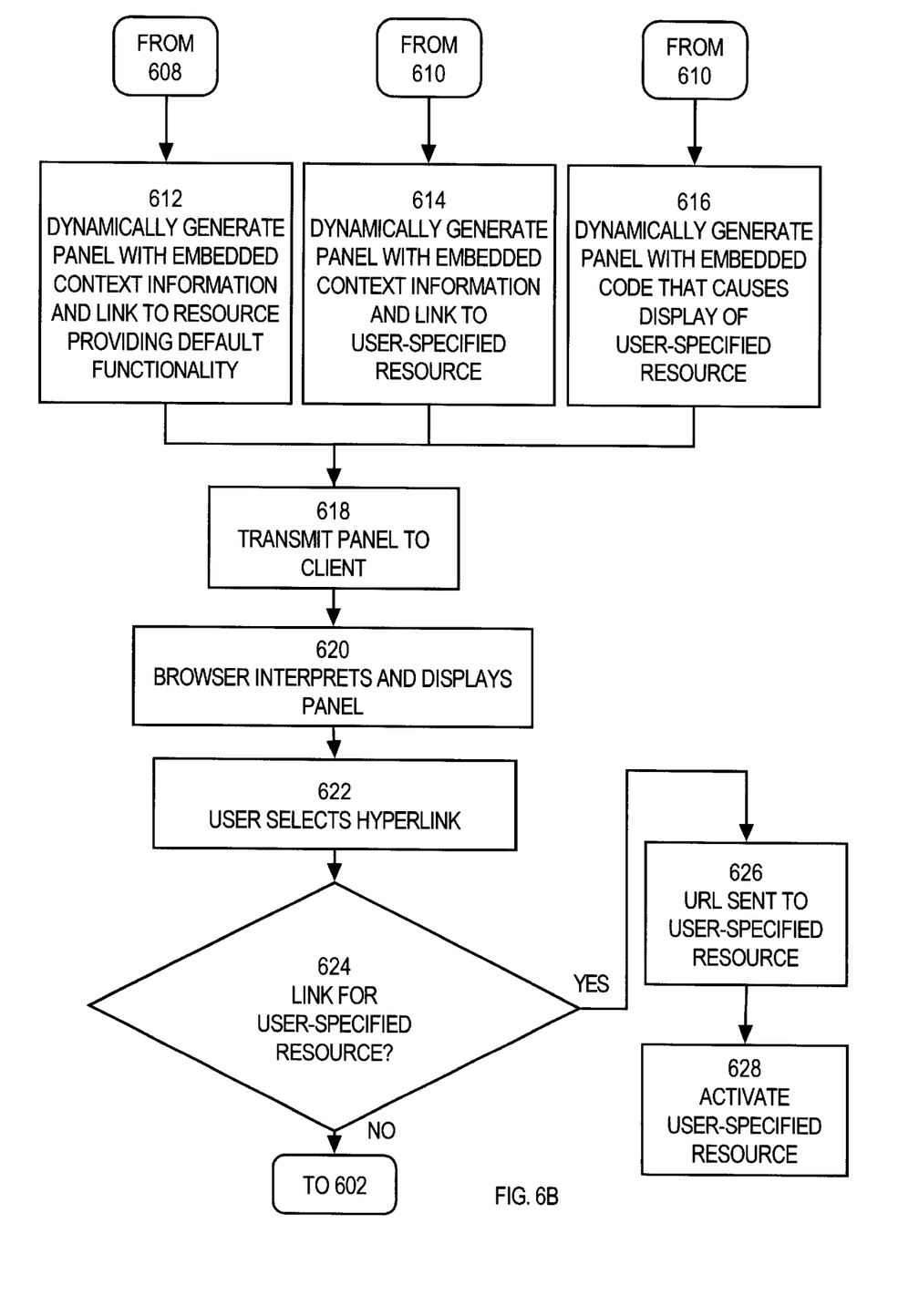

Referring to FIGS. 6a and 6b, they are a flow chart that illustrates steps performed during operation of a system that supports attachment of user-specified functionality to HTML-based panels. At step 602, browser 516 transmits over network 512 a URL that corresponds to the first panel of a task that the user 518 wishes to perform. The URL may be transmitted, for example, in response to user 518 selecting a hyperlink in an HTML page currently displayed by browser 516.

According to one embodiment, the HTML page that contains the hyperlink to start the task would have been dynamically generated by software application 501, and would have been designed to send back to software application 501 context information in addition to the selected URL. Such context information may include, for example, the user's identity, a task identifier, information entered by the user during previous tasks, the panel identifier of the HTML page that contained the hyperlink to the first panel, etc.

The URL for the first panel in the panel sequence of the task and any context information arrive at web listener 504. At step 604, the URL and the context information are sent to the software application 501 from the web listener 504. Specifically, the vendor-supplied resource identified by the URL is activated, and the context information is passed to the resource. The resource may be, for example, a CGI program that is responsible for dynamically generating the first panel in the panel sequence for the current task.

In response to receiving the URL and context information, the activated component of the software application 501 accesses database 502 to determine whether a user-specified resource is attached to the URL/context combination just received. If a user-specified resource is attached to the URL/context combination just received, then control passes to step 610. Otherwise, control passes to step 612.

As explained above, the database 502 will contain data that maps the URL/context combination to a user-specified resource identifier if the customer has attached functionality to that particular URL/context combination. For example, assume that the URL is "URL-P1" and the context information is "username=Fred, task=design report". Assume further that in the database 502 the only mapping that is associated with URL-P1 is a mapping between (URL-P1, user-group2) and (CUSTOMER-URL1). Under these conditions, the database 502 is searched to determine whether Fred is a member of user-group2. If Fred is a member of user-group2, then the resource identified by CUSTOMER-URL1 is attached to the received resource, and control passes to step 610. If Fred is not a member of user-group2, then control passes to step 612.

For the purpose of explanation, it shall be assumed that Fred is not a member of user-group2. Consequently, no user-specified resource is attached to the received URL/context combination, and control passes to step 612.

At step 612, the software application 501 dynamically generates the first panel. Context information is included within the HTML code generated for the first panel, as well as code to ensure that the context information is sent back to the software application 501 if the user selects certain hyperlinks in the panel. HTML code is also included for providing the default functionality of a control to which the customer can attach functionality, but to which the customer has not yet attached functionality. For example, the first panel may include a site button, and the software application 501 may generate the HTML code for the first panel to include a hyperlink that causes a particular HTML page to be generated when the site button is selected. The default HTML page displayed in response to the selection of site button may include, for example, controls for attaching functionality to the site button, or instructions on how to attach functionality to the site button.

When the HTML page for the first panel is generated, it is transmitted to the client at step 618. At step 620, the browser interprets and displays the panel. At this point, the user may enter any information requested by the panel relating to the sub-task associated with the panel. At step 622, the user selects a hyperlink in the panel. For the purpose of simplification, it shall be assumed that the panel has only two hyperlinks: a hyperlink to the next panel in the panel sequence and a hyperlink associated with the site button.

At step 624, it is determined whether the selected hyperlink is to a user-specified resource. In the present example, the hyperlink will not be to a user-specified resource because the customer has not attached any resource to the URL/context combination associated with the current instance of the first panel. If the user selects the site button, the user default functionality attached to the site button will be performed. For the purpose of explanation, it shall be assumed that the user selects the hyperlink to proceed to the second panel in the panel sequence. Control will thus proceed to step 602.

At step 602, browser 516 transmits over network 512 a URL that corresponds to the second panel of the task being performed, context information, and any information entered by the user into the first panel. The context information transmitted with the URL of the second panel may include, for example, the context information that was embedded in the HTML generated for the first panel (e.g. the task identifier and user identity), and the panel identifier of the first panel. The URL for the second panel and the context information arrive at web listener 504.

At step 604, the URL and the context information are sent to the software application 501 from the web listener 504. Specifically, the vendor-supplied resource identified by the URL is activated, and the context information is passed to the resource. The resource may be, for example, a CGI program that is responsible for dynamically generating the second panel for the report design task.

In response to receiving the URL and context information, the activated component of the software application 501 accesses database 502 to determine whether a user-specified resource is attached to the URL/context combination just received. If a user-specified resource is attached to the URL/context combination just received, then control passes to step 610. Otherwise, control passes to step 612.

Assume that the URL is "URL-P2" and the context information is "username=Fred, task=design report, entry point=URL-P1". Assume further that the database 502 includes a mapping between (URL-P2, task=design report) and (CUSTOMER-URL2). Under these conditions, the received URL and context match the URL/context combination that maps to CUSTOMER-URL2, so control passes to step 610.

According to one embodiment of the invention, the URL/context-to-resource mapping information within database 502 includes data that indicates the trigger to active each user-specified resource. If the user-specified resource is to be displayed on a panel, then the display of the panel is the trigger. If the user-specified resource is to be activated in response to selection of a user interface object on the panel (e.g. selection of a site button), then the selection of that particular user interface object is the trigger. At step 610, it is determined whether the user-specified resource CUSTOMER-URL2 is triggered by the display of the second panel. For the purposes of explanation, it shall be assumed that the trigger for CUSTOMER-URL2 is the selection of the site button on the second panel. Consequently, control passes to step 614.

At step 614, the software application 501 dynamically generates the second panel. Within the HTML code generated for the second panel, context information is embedded, as well as code to ensure that the context information is sent back to the software application 501 if the user selects certain hyperlinks in the panel. HTML code is also generated for activating the resource associated with CUSTOMER-URL2 in response to selection of the site button on the second panel.

When the HTML page for the second panel is generated, it is transmitted to the client at step 618. At step 620, the browser interprets and displays the panel. At this point, the user may enter any information requested by the panel relating to the sub-task associated with the panel. At step 622, the user selects a hyperlink in the panel. For the purpose of simplification, it shall be assumed that the panel has only two hyperlinks: a hyperlink to the next panel in the panel sequence and a hyperlink associated with the site button.

At step 624, it is determined whether the selected hyperlink is to a user-specified resource. In the present example, it shall be assumed that the user selects the hyperlink to proceed to the third panel in the panel sequence. Therefore, control will proceed again to step 602.

At step 602, browser 516 transmits over network 512 a URL that corresponds to the third panel of the task being performed, context information, and any information entered by the user into the preceding panels. The context information transmitted with the URL of the third panel may include, for example, the context information that was embedded in the HTML generated for the second panel (e.g. the task identifier and user identity), the context information from any previous panels, and the panel identifier of the second panel. The URL for the third panel and the context information arrive at web listener 504.

At step 604, the URL and the context information are sent to the software application 501 from the web listener 504. Specifically, the vendor-supplied resource identified by the URL is activated, and the context information is passed to the resource. The resource may be, for example, the a CGI program that is responsible for dynamically generating the third panel for the report design task.

In response to receiving the URL and context information, the activated component of the software application 501 accesses the database 502 to determine whether a user-specified resource is attached to the URL/context combination just received. If a user-specified resource is attached to the URL/context combination just received, then control passes to step 610. Otherwise, control passes to step 612.

Assume that the URL is "URL-P3" and the context information is "username=Fred, task=design report, entry point=URL-P2, reportname=MyReport". Assume further that the database 502 includes a mapping between (URL-P3, task=design report, entry point=URL-P2) and (CUSTOMER-URL3). Under these conditions, the received URL and context match the URL/context combination that maps to CUSTOMER-URL3, so control passes to step 610.

At step 610, it is determined whether the user-specified resource CUSTOMER-URL3 is triggered by the display of the third panel. For the purposes of explanation, it shall be assumed that the trigger for CUSTOMER-URL3 is the display of the third panel. Consequently, control passes to step 616.

At step 616, the software application 501 dynamically generates the third panel. Within the HTML code generated for the third panel, context information is embedded, as well as code to ensure that the context information is sent back to the software application 501 if the user selects certain hyperlinks in the panel. HTML code is also generated for activating the resource associated with CUSTOMER-URL3 in response to displaying the third panel.

For the purpose of explanation, it shall be assumed that the resource associated with CUSTOMER-URL3 is an image map designed by the customer. An image map is an image containing one or more regions, where each of the one or more regions is associated with a corresponding URL. The HTML generated for the third panel will therefore include code which causes the image map to be displayed in a particular section of the panel.

When the HTML page for the third panel is generated, it is transmitted to the client at step 618. At step 620, the browser interprets and displays the panel. During the interpretation, the browser 516 fetches the image map by sending a message over network 512 to web listener 524 that includes CUSTOMER-URL3. The web listener 524 retrieves the code associated with CUSTOMER-URL3, which includes the data required to display the image map, and transmits the code to the browser 516. Upon receipt of the image map code, browser 516 displays the image map within the designated section of the panel.

At this point, the user may enter any information requested by the panel relating to the sub-task associated with the panel. At step 622, the user selects a hyperlink in the panel. For the purpose of explanation, it shall be assumed that the user selects a particular region of the user-specified image map.

At step 624, it is determined whether the selected hyperlink is to a user-specified resource. In the present example, the user selected a region of the user-specified image map that corresponds to the URL of a user-specified resource. Therefore, control will proceed to step 626.

At step 626, the URL associated with the selected region of the image map is transmitted over network 512 to listener 524. The URL may identify, for example, a CGI program, an HTML page, or any other resource that can be identified by a URL. At step 628, the user-specified resource is activated. In this context, the actual operation performed to "activate" a resource depends on the type of resource. For example, a CGI program is activated by executing the CGI program. An HTML page is activated by transmitting the page to the browser that sent the message that contained the URL of the page.

As is evident by the flowchart in FIGS. 6a and 6b, the activation of a user-specified resource can cause a break in the panel-to-panel sequence presented by the software application 501. Significantly, the actions that transpire after the break are determined by the resources specified by the customer, and are not dictated or constrained by the software application 501. Thus, the user-specified resource may be a CGI program that simply fills in the current panel with particular values. Alternatively, the specified resource may be the first of a set of panels designed by the user to replace or supplement the panel sequence provided by the software application 501.

The user-supplied resource may simply be an HTML page that indicates the customer policies associated with the panel most recently displayed by the software application 501. After reading the customer policies, the user could cause the browser to return to the panel, and control would proceed to step 622.

Exemplary Uses of User-Specified Functionality

As described herein, techniques are provided that allow customers to attach functionality to the panels that a software application presents to a user during the performance of a task. Using these techniques, companies can readily provide users with information about choices that they should make at each of the panels.

Further, the functionality that customers attach to the panels may go far beyond the display of customer-specific information. For example, customers may cause certain buttons to invoke user-specified programs. Such programs may automatically fill in forms, automatically send a message to a help desk, or perform any other useful action. Customers may also use the ability to add functionality to the panels to circumvent or supplement one or more of the panels in the panel sequence of a task.

Embodiments of the present invention also support the attachment of context-dependent functionality. Thus, a certain panel may be attached to one user-specified action when the panel is displayed in one context, and attached to a completely different user-specified action when the panel is displayed in a different context. Within a web-based embodiment, context information is passed from panel to panel by embedding the context information in dynamically generated HTML panels. Because the functionality can be attached on a context-dependent basis, a panel can present certain classes of users with functionality that the panel does not present to other classes of users. In addition, a panel that is displayed in the context of one task can present different functionality than the same panel displayed in the context of a different task.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for allowing a user to attach a user-specified resource to a user interface panel that is generated by a software application, the method comprising the steps of:

creating and storing a mapping that associates a panel identifier that uniquely identifies the panel with the user-specified resource, with context criteria and with trigger criteria that specifies one user input action for triggering use of the user-specified resource that is selected from among a plurality of possible user input actions;

receiving a request to display said panel, wherein the request includes context information that represents a context in the software application relating to when the request occurs;

displaying the user-specified resource concurrently with said panel only when the request matches the specified user input action and when the context criteria match the context information.

2. The method of claim 1 wherein:

one criterion in the context criteria specifies a class of users;

the step of displaying the user-specified resource concurrently with said panel is performed only when a user that issues said request to display said panel belongs to said class of users and all other criteria in said set of context criteria are satisfied.

3. The method of claim 1 wherein:

said software application includes a plurality of entry points to arrive at said panel;

one criterion in the context criteria specifies an entry point to said panel; and the step of displaying the user-specified resource concurrently with said panel is performed only when the software application enters said panel through said entry point and all other criteria in said set of context criteria are satisfied.

4. The method of claim 1 wherein:

said panel belongs to panel sequences for a plurality of tasks;

one criterion in the context criteria specifies a particular task of said plurality of tasks;

the step of displaying the user-specified resource concurrently with said panel is performed only when said panel is displayed during performance of said particular task and all other criteria in the context criteria are satisfied.

5. The method of claim 1 wherein:

one criterion in the context criteria specifies a value; and the step of displaying the user-specified resource concurrently with said panel is performed only when said value was entered by a user in a previously displayed panel and all other criteria in said set of context criteria are satisfied.

6. The method of claim 1 wherein:

the step of creating and storing a mapping includes creating and storing that specifies an executable resource as the user-specified resource;

the step of displaying the user-specified resource concurrently with said panel comprises the steps of invoking the executable resource.

7. The method of claim 1 wherein the step of displaying the user-specified resource concurrently with said panel comprises the steps of altering the visual appearance of at least a region of said panel based on information obtained from said resource.

8. The method of claim 7 wherein:

the step of creating and storing a mapping includes the step of creating and storing a mapping that specifies an image;

the step of altering the visual appearance of at least a region of said panel includes displaying said image on said panel.

9. A method for providing a user-specified resource with a panel delivered as an HTML page over a network to a browser, the method comprising the steps of:

creating and storing a mapping that associates a panel identifier that uniquely identifies the panel with the user-specified resource, with context criteria and with trigger criteria that specifies one user input action for triggering invocation of the user-specified resource that is selected from among a plurality of possible user input actions;

receiving a first URL from the browser over the network, the first URL identifying said panel wherein the first URL includes context information that represents a context in a software application that generates the panel relating to when the request occurs;

determining whether a resource is associated with said panel based on the mapping; and if a resource is associated with said panel, and the request matches the specified user input action and the context criteria matches the context information then dynamically generating said panel to include code for activating said resource; and transmitting said first panel to said browser over said network.

10. The method of claim 8 wherein said software application includes a plurality of entry points to arrive at said panel; one criterion in the context criteria specifies an entry point to said panel; and dynamically generating said panel is performed only when the software application enters said panel through said entry point and all other criteria in said set of context criteria are satisfied.

11. The method of claim 9 wherein:

said panel is a panel in a sequence of panels for performing a particular task;

said panel is preceded in said sequence of panels by a prior panel;

the method includes the steps of dynamically generating the prior panel to include a user interface object which, when selected, transmits context information with said first URL;

transmitting said prior panel to said browser before receiving said first URL; and the step of receiving the first URL includes receiving the first URL and said context information in response to a user selecting said user interface object.

12. The method of claim 11 wherein:

said panel belongs to panel sequences for a plurality of tasks;

one criterion in the context criteria specifies a particular task of said plurality of tasks;

the step of displaying said panel is performed only when said panel is displayed during performance of said particular task and all other criteria in the context criteria are satisfied.

13. A computer-readable medium carrying one or more sequences of instructions for allowing a user to attach a user-specified resource to a user interface panel that is generated by a software application, wherein execution of the one or more sequences of instructions by one or more processors causes the one or more processors to perform the steps of:

creating and storing a mapping that associates a panel identifier that uniquely identifies the panel with the user-specified resource, with context criteria and with trigger criteria that specifies one user input action for triggering invocation of the user-specified resource that is selected from among a plurality of possible user input actions;

receiving a request to display said panel, wherein the request includes context information that represents a context in the software application relating to when the request occurs;

displaying the user-specified resource concurrently with said panel only when the request matches the specified user input action and when the context criteria match the context information.

14. A network system comprising:

one or more computer systems;

a panel generation mechanism executing on said one or more computer systems;

said panel generation mechanism being configured to generate a panel sequence to perform a task, said panel generation mechanism allowing a user to attach functionality to a panel within said panel sequence;

said panel generation mechanism including a processor executing instructions to perform the steps of:

creating and storing a mapping that associates a panel identifier that uniquely identifies the panel with the user-specified resource, with context criteria and with trigger criteria that specifies one user input action for triggering invocation of the user-specified resource that is selected from among a plurality of possible user input actions;

receiving a request to display said panel, wherein the request includes context information that represents a context in the software application relating to when the request occurs;

displaying the user-specified resource concurrently with said panel only when the request matches the specified user input action and when the context criteria match the context information.

\* \* \* \* \*

UNITED STATES PATENT AND TRADEMARK OFFICE
CERTIFICATE OF CORRECTION

PATENT NO. : 6,243,088 B1
DATED : June 5, 2001
INVENTOR(S) : John McCormack et al.

It is certified that error appears in the above-identified patent and that said Letters Patent is hereby corrected as shown below:

Column 20, claim 10,
Line 20, replace "claim 8" with -- claim 9 --.

Signed and Sealed this

Twenty-fifth Day of December, 2001

Attest:

Attesting Officer

JAMES E. ROGAN
*Director of the United States Patent and Trademark Office*